US009127448B2

(12) United States Patent
Thomas

(10) Patent No.: US 9,127,448 B2
(45) Date of Patent: Sep. 8, 2015

(54) RETROFIT CATCH BASIN FOR USE IN STORM WATER MANAGEMENT PRACTICE

(71) Applicant: Kyle E Thomas, Syracuse, NY (US)

(72) Inventor: Kyle E Thomas, Syracuse, NY (US)

( * ) Notice: Subject to any disclaimer, the term of this patent is extended or adjusted under 35 U.S.C. 154(b) by 26 days.

(21) Appl. No.: 13/691,869

(22) Filed: Dec. 3, 2012

(65) Prior Publication Data

US 2014/0154006 A1 Jun. 5, 2014

(51) Int. Cl.
*E03F 5/10* (2006.01)
*E03F 5/046* (2006.01)

(52) U.S. Cl.
CPC ............... *E03F 5/105* (2013.01); *E03F 5/046* (2013.01); *E03F 5/101* (2013.01)

(58) Field of Classification Search
CPC ........... E03F 5/0409; E03F 5/04; E03F 5/046; E03F 5/0402; E03F 5/0411; E03F 5/106; E03F 5/101; E03F 5/105
USPC .......... 404/2, 4, 5, 8; 405/36, 39, 40, 43, 118, 405/119; 210/162–165, 498, 170.03, 299, 210/307; 4/497, 508, 510, 512
See application file for complete search history.

(56) References Cited

U.S. PATENT DOCUMENTS

| | | | | |
|---|---|---|---|---|
| 3,577,570 | A * | 5/1971 | Vincent | 4/497 |
| 6,062,767 | A * | 5/2000 | Kizhnerman et al. | 405/39 |
| 6,905,599 | B2 * | 6/2005 | Allard | 210/602 |
| 7,425,105 | B2 * | 9/2008 | Grimes | 404/2 |
| 7,776,217 | B2 * | 8/2010 | Lucas | 210/602 |
| 8,002,977 | B2 * | 8/2011 | Shaw et al. | 210/164 |
| 8,333,885 | B1 * | 12/2012 | Iorio | 210/150 |
| 2005/0042030 | A1 * | 2/2005 | Fu | 405/36 |
| 2008/0145150 | A1 * | 6/2008 | Shaw et al. | 405/52 |
| 2009/0101591 | A1 * | 4/2009 | Lewis | 210/747 |
| 2011/0147303 | A1 * | 6/2011 | Allard | 210/601 |
| 2011/0186492 | A1 * | 8/2011 | Holtz | 210/170.03 |
| 2012/0152827 | A1 * | 6/2012 | Allard | 210/602 |
| 2012/0217205 | A1 * | 8/2012 | Lord et al. | 210/747.3 |
| 2013/0140229 | A1 * | 6/2013 | Allen et al. | 210/602 |

FOREIGN PATENT DOCUMENTS

| | | | | |
|---|---|---|---|---|
| GB | 312785 | * | 5/1928 | E03F 5/046 |
| GB | 1541763 A | * | 3/1979 | E03F 5/046 |
| GB | 2080373 A | * | 2/1982 | E03F 5/046 |

* cited by examiner

*Primary Examiner* — Thomas B Will
*Assistant Examiner* — Jessica H Lutz
(74) *Attorney, Agent, or Firm* — Burr & Brown, PLLC

(57) ABSTRACT

A catch basin retrofit that allows stormwater to be diverted from an existing storm sewer to an alternative stormwater management practice (SMP), while maintaining functionality of the catch basin as an overflow device for the alternative SMP.

15 Claims, 12 Drawing Sheets

US 9,127,448 B2

RETROFIT CATCH BASIN FOR USE IN STORM WATER MANAGEMENT PRACTICE

FIELD OF THE INVENTION

The present invention relates to the field of storm water management. More particularly, the present invention is an adaptation to existing conventional stormwater infrastructure to retrofit for an alternative stormwater management practice (SMP). The present invention is particularly applicable where more modern "green infrastructure" technologies are being incorporated into existing urban drainage systems.

BACKGROUND OF THE INVENTION

Urban stormwater management has historically involved collection of rainwater and conveyance via piping either directly to receiving waters or through wastewater treatment plants (WWTPs). In dozens of cities in the United States such conveyance has occurred through combined sewer systems (CSSs), which convey both stormwater and sewage to WWTPs. Such CSSs are typically equipped with overflow devices that allow discharge directly to receiving waters from the sewer system when the sewer capacity is exceeded. Such combined sewer overflow (CSO) events contain not only stormwater but also untreated human and industrial waste, toxic materials, and debris. They are a major water pollution concern for the approximately 772 cities in the U.S. that have these CSSs.

Many communities, including New York, N.Y.; Philadelphia, Pa., Kansas City, Mo. and Syracuse, N.Y. are implementing green infrastructure ("GI") techniques. GI is an approach that communities can choose to maintain healthy waters, provide multiple environmental benefits and support sustainable communities. Unlike single-purpose gray stormwater infrastructure, which uses pipes to dispose of rainwater, green infrastructure uses vegetation and soil to manage rainwater where it falls. By weaving natural processes into the urban constructed environment, green infrastructure provides not only stormwater management, but also flood mitigation, air quality management, and more. It is important to note that GI is a volume-based approach to stormwater management, not typically amenable to managing peak flows associated with storm events. Thus, where GI is being incorporated into urban infrastructure, it is usually required by the locality to incorporate an overflow outlet to provide for drainage during extreme events.

A component of conventional "gray" stormwater management systems for conveying street runoff to sewer systems are often street side catch basins 1 an example of which is depicted on FIG. 1. As will further be seen in FIG. 1 these systems consist of an underground constructed sump 2 covered by a traffic-rated frame and grate 3 an outlet pipe 4 connected to a sewer system. Stormwater enters the catch basin via gravity either as sheet-flow from the street, or is conveyed along the adjoining curb 5 as can be seen in FIG. 1. An example of the prior art frame and grate assembly 3 is depicted on FIG. 2. In FIG. 2, the assembly typically consists of a traffic-rated grate 6 that allows stormwater to enter the catch basin with the slats of the grate serving to screen the waters of "floatables" (i.e. large floating materials) that would otherwise enter the catch basin. The slats of the grate are directed orthogonal to the direction of traffic, which in combination with its construction to meet vehicle traffic standards, allows vehicular traffic to pass over safely and without damage to the device. The grate is set inside a compatible, traffic-rated frame 7, as shown in FIG. 2, that positions and mounts the assembly to the catch basin sump and the surrounding road and curb. Because the device operates by gravity, the catch basin is typically positioned at a locally minimum elevation in the road segment or city block.

A common GI technique to managing street runoff is through the use of street-side bioretention or tree boxes, as is depicted in FIGS. 3 and 4. These techniques usually require the use of constructed curb inlets, as shown in FIG. 5, consisting of transitions 8 from granite curbing 9 to form an opening in the curb 9 that allows water from the street 10 to enter the GI measure located on the opposite side of the curb 9. The GI measure is also typically equipped with overflow devices to allow storm events to be diverted from the GI measure to the storm sewer system. Where these techniques are being adapted to existing urban drainage conditions, curb inlets and overflow devices are necessarily constructed as retrofits to the existing infrastructure. Construction of such overflow devices is typically a costly, invasive endeavour involving setting and plumbing of pre-cast or other manufactured overflow catch basins, plumbed into existing sewer systems located in the public street or right-of-way as discussed below.

Because, as discussed above, the location of stormwater catch basins are configured at low points in the streetscape in order to effectively capture stormwater runoff via gravity, retrofit curb inlets might be positioned on each side of the existing catch basin. This design allows effective capture of flow along the curbline 11 and 12 to the existing catch basin as is exemplified in FIG. 6. As discussed above, a mechanism for managing overflows is a necessary component of these GI measures and this is accomplished under this curb inlet configuration by maintaining the existing streetside catch basin in place so that water may back up and out of the bioretention area 13 into the catch basin during extreme storm events. This configuration does not, however, optimize stormwater collection as water that routes directly to the plane of the catch basin from the street 14 (i.e. not along the curbline) will continue to enter the catch basin and thus the sewer during rain events.

An alternative design involves the decommissioning and replacement of the existing catch basin with a curb inlet. This configuration effectively captures all runoff (for purposes of this invention, runoff, storm-water runoff and street runoff will be used interchangeably as would be understood by those skilled in the art) to the existing catch basin, up to the retentive capacity of the SMP, but a new overflow structure is required to accommodate runoff exceeding design events. An example of this prior art is shown on FIG. 7. Such overflow structures are often precast structures 15 equipped with a slotted opening 16 serving as the overflow entry weir, which must be plumbed into the existing storm sewer 17 system with underground pipes 18.

SUMMARY OF THE INVENTION

While the aforementioned prior art catch basin designs and associated collection frames and grate fulfills certain objectives and requirements, a need exists for a more efficient, less expensive means for retrofitting such existing catch basins/rack and grate systems for adoption of alternative SMPs, particularly as it relates to GI. In one aspect, the current invention seeks to solve the problems associated with the prior art by utilizing a rack and covered grate assembly that will effectively divert runoff to a GI measure through a common curb inlet structure while allowing the existing catch basin to serve as an overflow device, and that also screens debris from the catch basin as effectively as the replaced system. In one aspect, the benefit of the current invention is the avoided cost of the dedicated additional overflow structure and the greater efficiency of collection of the curb inlet.

In the various figures, the prior art and SMP/GI technologies are illustrated as well as the exemplary features of the invention are demonstrated so that the detailed description that follows may be better understood, and that the present contribution to the art may be better appreciated. There are additional features of the invention that will be described hereinafter and which will form the subject matter of the claims appended hereto. In no way should the following figures and examples limit the scope of the invention, as would be understood and appreciated by those skilled in the art. It will be understood that the aforementioned references are incorporated by reference.

DETAILED DESCRIPTION

Figure 1:
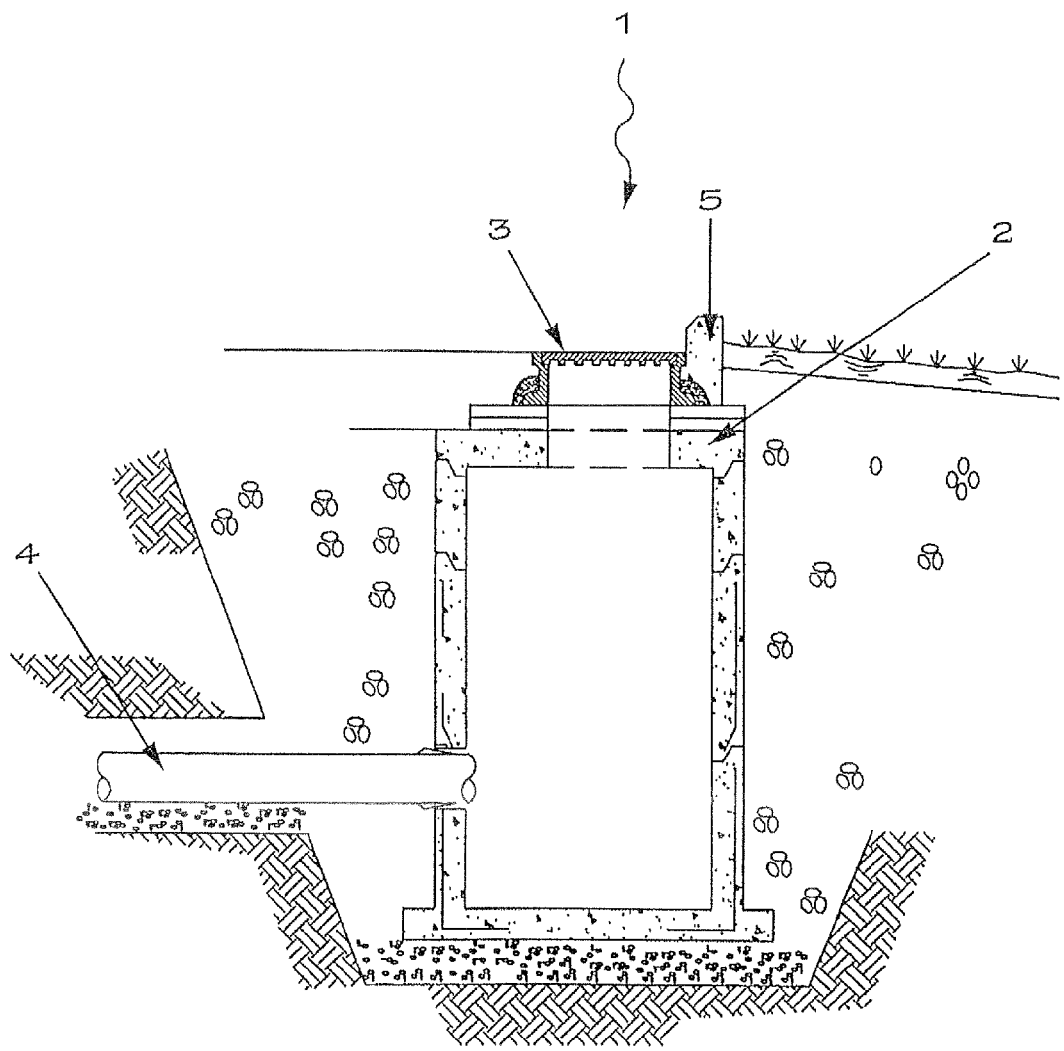
FIG. 1 shows a cross sectional view of a typical urban street side catch basin with associated horizontal rack and grate assembly.
Figure 2:
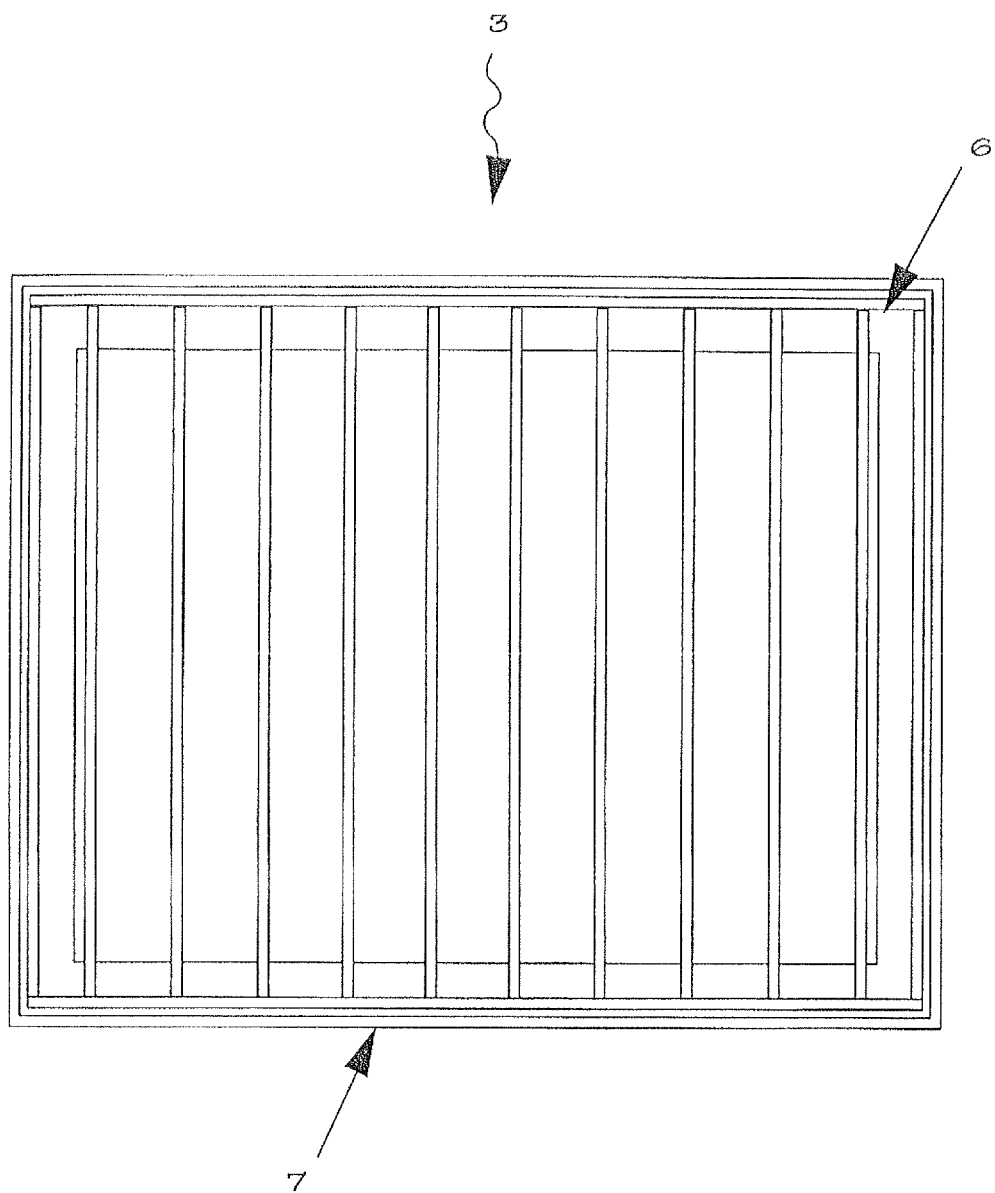
FIG. 2 is a plan view of a detailed drawing of a catch basin frame and rack assembly.
Figure 8:
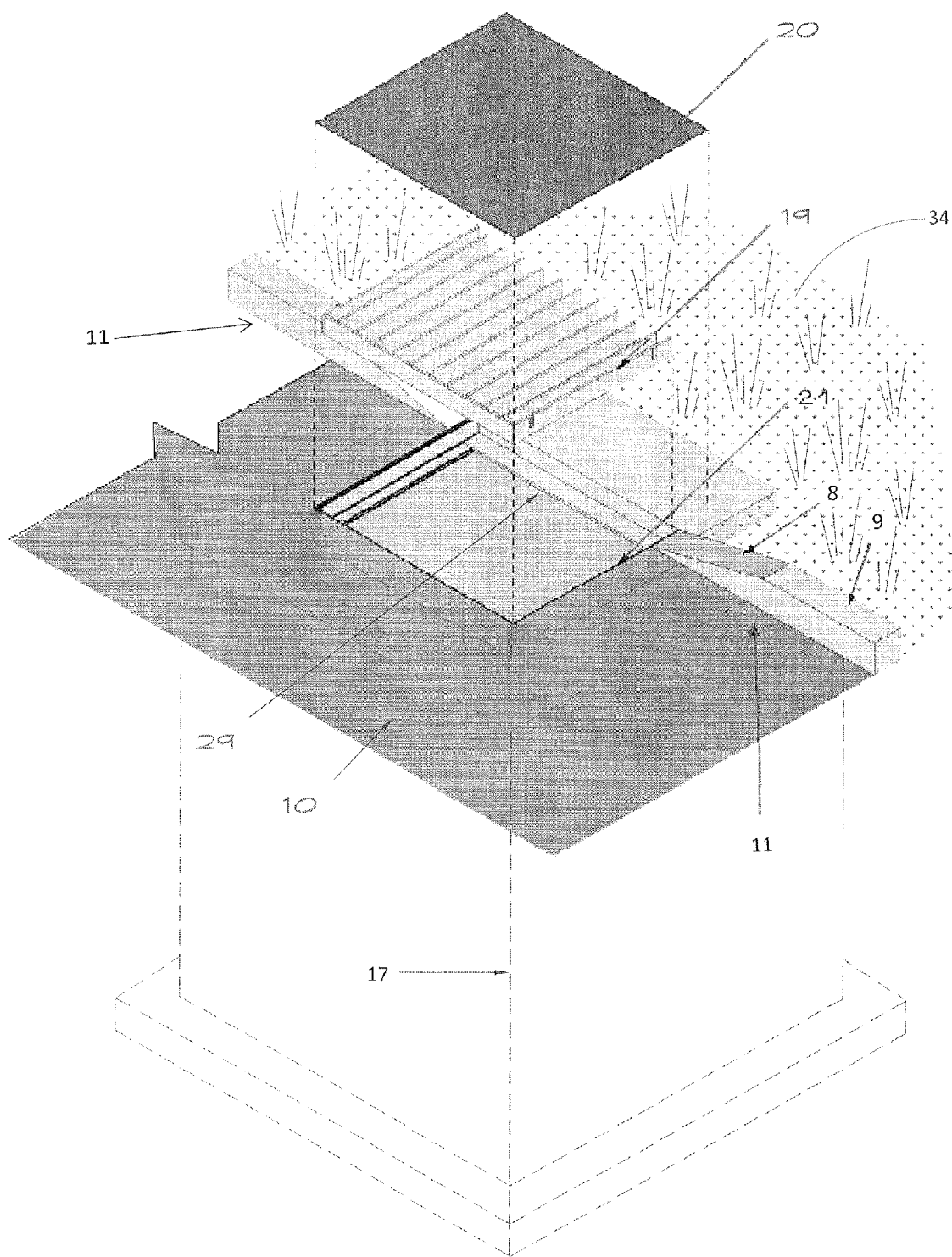
FIG. 8 is an exploded, axinometric representation of the catch basin and diversion assembly, including trash screen, cover plate and structural frame as envisioned by the current invention.

FIG. 8 shows an exemplary embodiment of a stormwater diversion and overflow device. An exemplary assembly of the diversion and overflow device generally consists of a grate 19 and cover plate 20 set in a frame 21. The grate 19 and frame 21 portion of the assembly is typical of a stormwater collection and trash screen device, as represented in FIG. 2 and as is readily understood by those skilled in the art, but with differences as discussed in the following passages.

Figure 9:
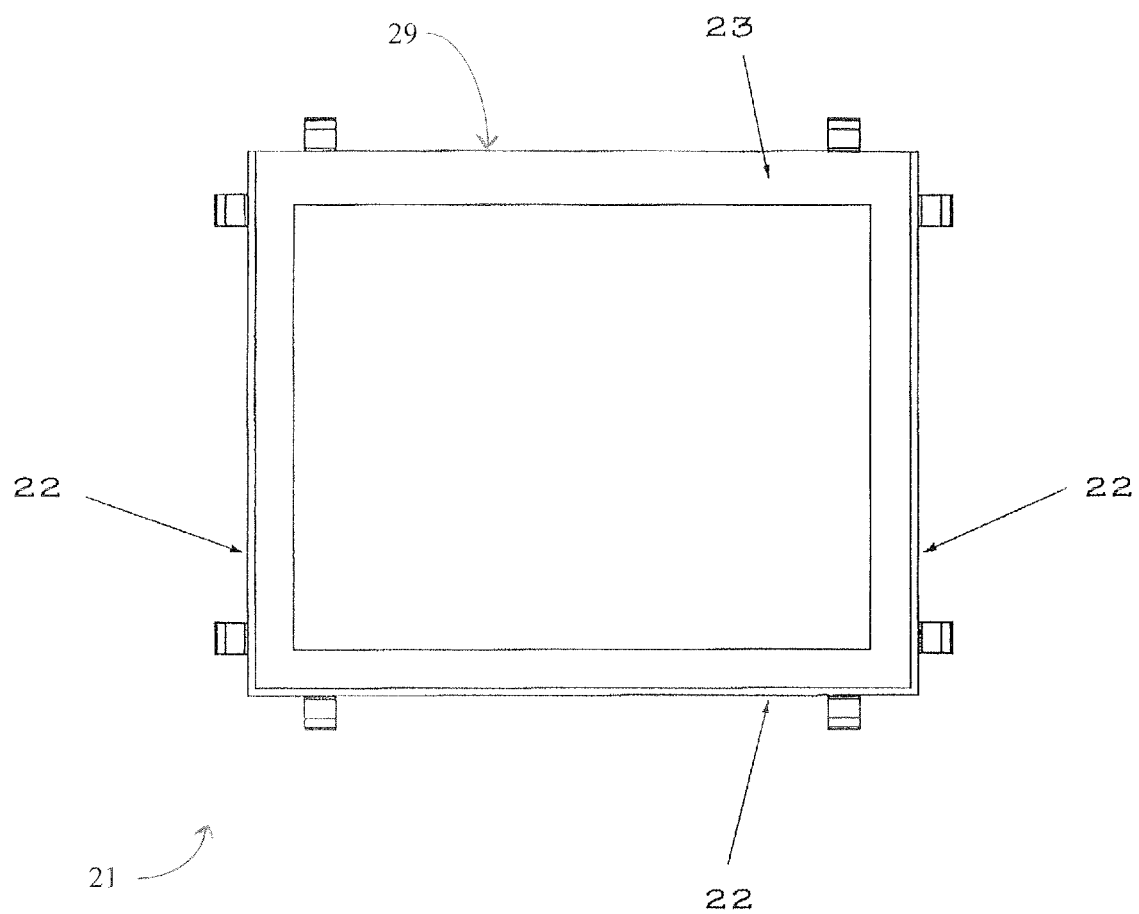
FIG. 9 is a plan view of the exemplary invention as installed.

FIG. 9 depicts the frame 21 portion of the stormwater diversion and overflow device in plan view. With reference to FIG. 8 and FIG. 9, it can be seen that on three sides, the frame 21 is similar to the prior art catch basin frame by the presence of angle members forming much of the strength of the assembly. Each angle member comprises a vertical member 22 and a horizontal member 23. The invention is distinguished, in part, from the conventional frame by the absence of the vertical member 22 from the angle member forming the curbside edge 29 of the frame 21. This portion of the frame 21 consists of the horizontal member 23 only. The absence of the vertical portion 22 of the curbside angle member will allow the stormwater diversion and overflow device to serve its overflow function by allowing the flow to pass from the SMP to the existing catch basin beneath the cover plate 20 of the invention via the curb inlet.

Figure 10:
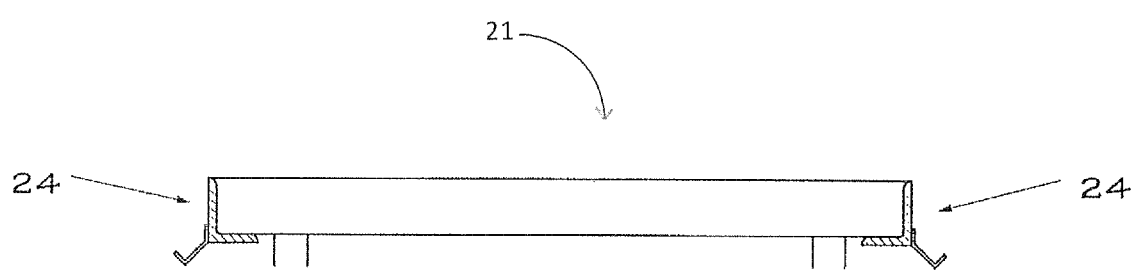
FIG. 10 is a profile view of the exemplary invention oriented along its longitudinal axis.

FIG. 10 depicts the frame 21 portion of the stormwater diversion and overflow device in profile view. The invention members shown are the angle members 24 of the frame 21, with the frame 21 oriented along the curbline. For purposes of clarity, one of skill in the art will understand that "curbline" and "curbside edge" can be used interchangeably.

Figure 11:
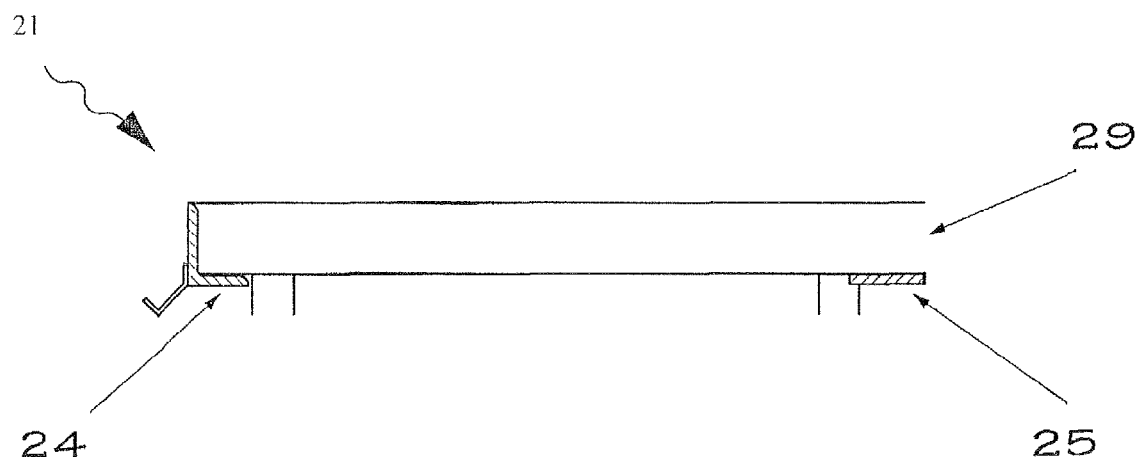
FIG. 11 is a profile view of the exemplary invention oriented along its lateral axis.

FIG. 11 depicts a second profile view of the frame 21 portion of the stormwater diversion and overflow device, with the shown angle member 24, which has both a vertical member 22 and a horizontal member 23, located on the street-side of the invention, and the angle member 25, which has a horizontal member 23 but no vertical member 22, located on the curbside edge 29 of the invention abutting the curb inlet.

Figure 12:
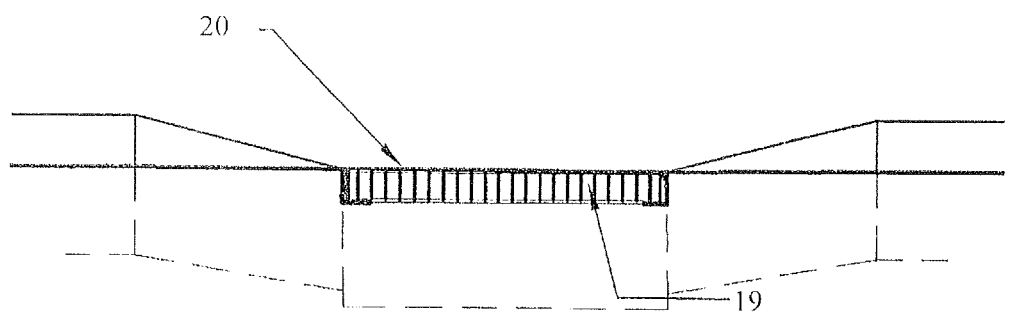
FIG. 12 shows a cross sectional view of the exemplary grate and cover portion of the storm water management practice system.

FIG. 12 shows the grate 19 and cover plate 20 of the stormwater diversion and overflow device in profile as it would appear to an observer looking from the SMP toward the street. With reference to FIG. 8 and FIG. 12, the grate 19 and cover plate 20 are discussed. Similar to the frame 21 portion of the stormwater diversion and overflow device described above, the grate 19 of the stormwater diversion and overflow device is distinguished from a conventional grate by the absence of curbside lateral edge that would otherwise contact the curbside edge of the frame. Again similar to the adaptation for the frame 21 described above, the absence of a vertical edge parallel to the curb will allow the stormwater diversion and overflow device to serve its overflow function by allowing flow to pass from the SMP to the existing catch basin beneath the cover plate 20 of the invention via the curb inlet. Grate slats 27 oriented normal to the plane of the curb and extending over the lateral curbside edge 29 of the frame 21 will function as the trash screen, the functional equivalent of the grate associated with the conventional catch basin grate (FIG. 2). The cover plate 20 of the stormwater diversion and overflow device extends beyond the grate 19 and frame 21 as necessary and over the curb inlet threshold in order to effectively divert runoff to the SMP. The runoff occurs as sheet-flow, which is important to the functionality of vegetated GI such as a bioretention area.

Of course it will be understood by those skilled in the art that the slots in the grate can be of differing dimensions and spacing depending on the screening objectives, and that the frame, grate and cover can be constructed of different materials including but not limited to steel, galvanized steel, iron, galvanized iron, aluminum, or synthetic materials such as polyvinyl chloride (PVC). It will also be understood by those skilled in the art that cover can be extended varying lengths into the SMP and equipped with a drip edge or other appurtenances to effect proper flow or to dissipate energy as flow occurs from the invention to the SMP. It will further be understood by those skilled in the art that the invention may be of different sizes and configurations to adapt to the many various designs of stormwater catch basins whether they may be located directly under the stormwater frame and grate as described above, or adjoining the assembly, located adjacent to the street or lot.

Figure 3:
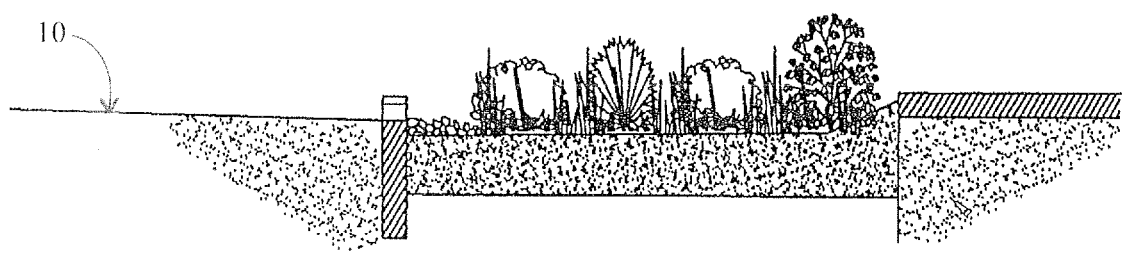
FIG. 3 shows a cross sectional view of a curbside bioretention area that might be used for management of runoff from an urban roadway.
Figure 4:
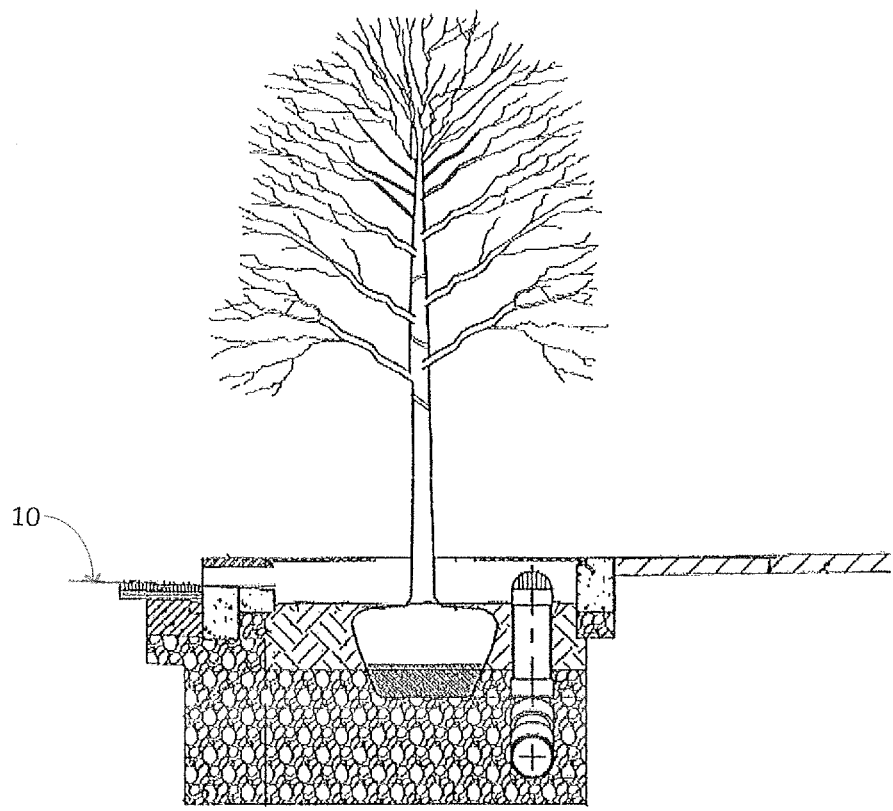
FIG. 4 is an exemplary cross sectional representation of a "tree box," with a similar function for stormwater management.
Figure 5:
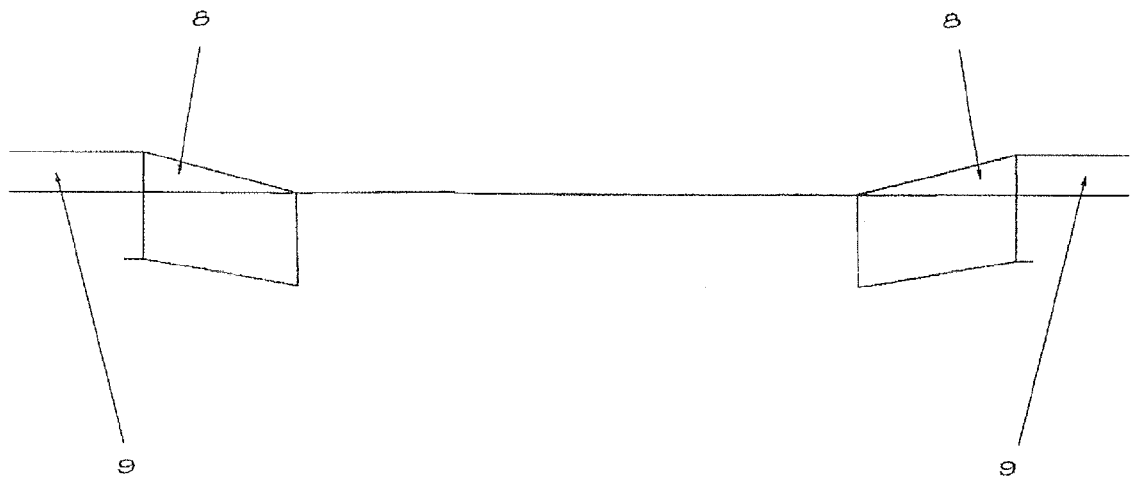
FIG. 5 is a cross sectional view of a typical curb inlet used to divert runoff to street/curbside SMP
Figure 6:
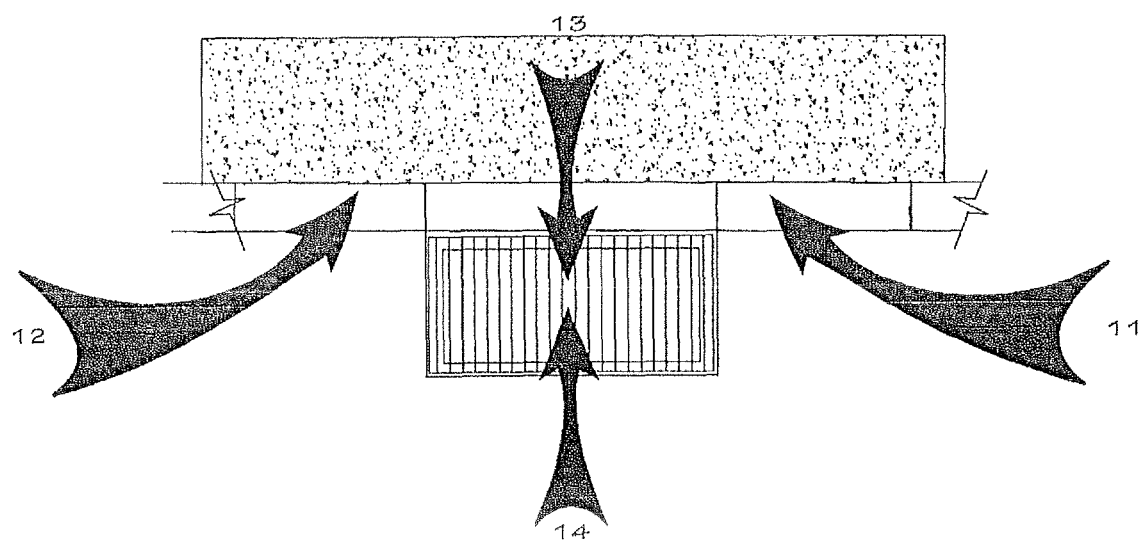
FIG. 6 is a plan view of a possible curb inlet configuration retrofitted around an existing stormwater catch basin
Figure 7:
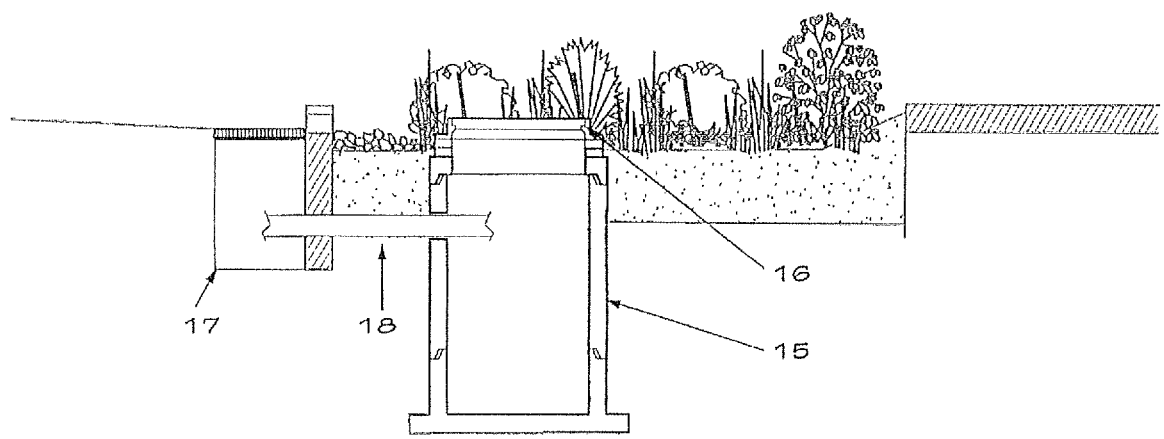
FIG. 7 is a profile view of the prior art pre-cast concrete overflow structure.

Referring back to the exemplary embodiment of FIG. 8, a catch basin diversion system 30 is depicted wherein an existing street-side catch basin 17 is retrofitted with the stormwater diversion and overflow device so that stormwater, instead of entering the catch basin 17 and then the public sewer system, is diverted via a cover plate 20 to an alternative SMP 34 (e.g., the bioretention area or tree box of FIGS. 3 and 4). The cover plate 20 is situated above the level of the curb inlet (FIG. 5) elevation by a grate 19 that both provides the opening to the catch basin 32 so that backflow to the catch basin 17 from the SMP 34 (FIGS. 3 and 4) can occur during overflow events, and prevents floatables and other debris from entering the catch basin 17.

As conventional catch basin frame and grate assemblies are pre-manufactured in standard sizes, so would the claimed Invention be fabricated to a number of common dimensions. The retrofit of existing installations would be performed by simply lifting out the existing assembly then placing the claimed invention while constructing the curb inlet.

What is claimed is:

1. A stormwater diversion and overflow device, the device comprising:
   a grate assembly,
   the grate assembly comprising a grate, a cover, and a structural frame,
   the grate defining a first side, a second side opposing the first side, and a volume between the first side and the second side,
   the grate comprising an outer wall connecting the first side to the second side and extending at least part way around the volume, the outer wall defining a third side, a fourth side, and a fifth side of the grate,
   the grate comprising at least a first opening extending through the grate from the first side to the second side, at least one of the at least a first opening extending through a sixth side of the grate,
   the cover comprising a plate, being directly on the first side of he grate, and bounding each at least a first opening on the first side of the grate,
   the cover configured to cover an existing street-side catch basin,
   the cover configured to divert stormwater runoff off a street through a curb inlet structure shared with the existing street-side catch basin to an alternative stormwater management practice system before the stormwater runoff enters the existing street-side catch basin,
   the cover bounding at least a portion of each at least a first opening where each at least a first opening extends through the sixth side of the grate, the cover configured to pass stormwater runoff from the alternative stormwater management practice system to the existing street-side catch basin,
   the grate set in the structural frame,
   the plate extending beyond the grate and the structural frame by an amount sufficient to carry the stormwater runoff to the alternative stormwater management practice system.

2. The stormwater diversion and overflow device of claim 1, wherein said stormwater diversion and overflow device is retrofitted to the existing street-side catch basin.

3. The stormwater diversion and overflow device of claim 1, wherein said grate assembly further comprises a horizontal member, the horizontal member oriented parallel to the cover, the grate assembly retrofitted to the existing street-side catch basin, the horizontal member configured to pass, in the installed position, over the existing street-side catch basin, flowing runoff water through the curb inlet and the stormwater diversion and overflow device to the existing catch basin beneath the cover portion.

4. The stormwater diversion and overflow device of claim 1, wherein said grate comprising grate slats, the grate slats configured to collect debris and allow stormwater runoff to pass through to the stormwater management practice system.

5. The stormwater diversion and overflow device of claim 1, wherein the plate is equipped with a drip edge to facilitate distribution of flow to the stormwater management practice.

6. The stormwater diversion and overflow device of claim 1, wherein the grate is directly adjacent to the cover portion.

7. The stormwater diversion and overflow device of claim 1, wherein the grate assembly is insertable and removable as a unit from the top of the existing street-side catch basin.

8. A stormwater diversion and overflow device, the device comprising:
   a frame comprising an angle member having a first portion and a second portion, the second portion oriented at an angle to the first portion, the first portion extending less than 360 degrees around a perimeter of the frame and defining an opening through the perimeter;
   a grate; and
   a cover,
   the cover set in the frame,
   the cover extending beyond the frame and extending beyond the opening in a direction toward which the opening faces an amount sufficient to carry stormwater runoff to a stormwater management practice system,
   the grate set in the frame directly adjacent to the cover,
   the grate comprising a first member and a plurality of slats, each of the plurality of slats having a first end and a second end, each of the plurality of slats extending from the first member at the first end, at least one of the slats remaining free and unconnected at the second end.

9. The stormwater diversion and overflow device of claim 8, wherein the first portion is oriented perpendicular to the cover.

10. The stormwater diversion and overflow device of claim 8, wherein the second portion of the angle member is oriented parallel to the cover, the second portion being connected perpendicularly to the first portion.

11. The stormwater diversion and overflow device of claim 8, wherein the second portion of the angle member extends 360 degrees around the perimeter of the frame.

12. The stormwater diversion and overflow device of claim 10, wherein the second portion of the angle member comprises an extension on each of four sides of the perimeter of the frame, each extension being perpendicular to each adjacent extension.

13. The stormwater diversion and overflow device of claim 8, wherein the perimeter of the frame has four sides, the first portion of the angle member extending on three sides of the perimeter of the frame, defining the opening on the fourth side of the perimeter of the frame.

14. The stormwater diversion and overflow device of claim 8, wherein the grate further comprises:
   an edge element comprising at least a portion of a perimeter of the grate, the edge element defining an opening in the perimeter of the grate through which fluid can flow.

15. The stormwater diversion and overflow device of claim 8, wherein the cover comprises a plate-shaped portion, the plate-shaped portion having two opposing surfaces and at least one peripheral surface, the two opposing surfaces comprising a majority of the total surface area of the plate-shaped portion, the at least one peripheral surface connecting between the two opposing surfaces, the frame extending at least 90 degrees around the at least one peripheral surface.

* * * * *